(12) United States Patent
Templin (10) Patent No.: US 8,447,491 B2
(45) Date of Patent: May 21, 2013

(54) METHOD AND CONTROLLER FOR CONTROLLING OUTPUT TORQUE OF A PROPULSION UNIT

(75) Inventor: Peter Templin, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/382,531

(22) PCT Filed: Jul. 5, 2010

(86) PCT No.: PCT/EP2010/003986
§ 371 (c)(1),
(2), (4) Date: Jan. 6, 2012

(87) PCT Pub. No.: WO2011/003544
PCT Pub. Date: Jan. 13, 2011

(65) Prior Publication Data
US 2012/0101705 A1    Apr. 26, 2012

Related U.S. Application Data (60) Provisional application No. 61/223,428, filed on Jul. 7, 2009.

(51) Int. Cl.
    *G06F 19/00*    (2011.01)
    *G06G 7/70*    (2006.01)
(52) U.S. Cl.
    USPC ............................................ 701/99; 701/110
(58) Field of Classification Search
    USPC .................................................. 701/99, 110
    See application file for complete search history.

(56) References Cited

U.S. PATENT DOCUMENTS

| | | | | |
|---|---|---|---|---|
| 4,353,272 A | * | 10/1982 | Schneider et al. | 477/43 |
| 4,823,645 A | * | 4/1989 | Gaus et al. | 477/111 |
| 5,377,110 A | * | 12/1994 | Ikeura | 701/54 |
| 5,417,625 A | * | 5/1995 | Yamaki et al. | 477/109 |
| 5,496,227 A | * | 3/1996 | Minowa et al. | 477/62 |
| 5,890,470 A | * | 4/1999 | Woon et al. | 123/350 |

(Continued)

FOREIGN PATENT DOCUMENTS

EP    2070798 A2    6/2009

OTHER PUBLICATIONS

Serrarens A et al: "Simulation and control of an automotive dry clutch", American Control Conference, 2004. Proceedings of the 2004 Boston, MA, USA Jun. 30-Jul. 2, 2004, Piscataway, NJ, USA,IEEE, vol. 5, Jun. 30, 2004 pp. 4078-4083, XP010761395,ISBN: 978-0-7803-8335-7.

(Continued)

*Primary Examiner* — Calvin Cheung
(74) *Attorney, Agent, or Firm* — WRB-IP LLP (57) ABSTRACT

Method for controlling output torque ($T_{eng}$) of a propulsion unit in a vehicle powertrain including driven wheels drivingly connected to the propulsion unit via a mechanical transmission with a drive shaft, wherein the method including the steps of registering driver torque demand ($T_d$) for vehicle propulsion, registering propulsion unit rotational speed ($\omega_e$), and controlling the output torque ($T_{eng}$) of the propulsion unit to asymptotically follow the driver torque demand ($T_d$) using a closed-loop linear-quadratic regulator (LQR) based controller (9) having the driver torque demand ($T_d$) and the propulsion unit rotational speed ($\omega_e$) as input data, in order to minimize driveline oscillations.

13 Claims, 5 Drawing Sheets

U.S. PATENT DOCUMENTS

| | | | |
|---|---|---|---|
| 6,173,226 B1 * | 1/2001 | Yoshida et al. | 701/51 |
| 6,248,041 B1 * | 6/2001 | Den Besten | 477/110 |
| 6,377,882 B1 | 4/2002 | Ito | |
| 6,773,368 B1 * | 8/2004 | Williames | 475/74 |
| 7,002,259 B2 * | 2/2006 | Howes et al. | 290/4 C |
| 7,047,124 B2 * | 5/2006 | Eriksson et al. | 701/110 |
| 7,174,714 B2 * | 2/2007 | Algrain | 60/608 |
| 8,050,856 B2 * | 11/2011 | Duty et al. | 701/123 |
| 2002/0014773 A1 * | 2/2002 | Stricker | 290/44 |
| 2002/0132699 A1 * | 9/2002 | Bellinger | 477/107 |
| 2005/0001480 A1 * | 1/2005 | Tabata et al. | 303/141 |
| 2009/0093937 A1 * | 4/2009 | Lupo et al. | 701/84 |
| 2012/0130608 A1 * | 5/2012 | Fujii et al. | 701/54 |

OTHER PUBLICATIONS

International Search Report for corresponding International Applciation PCT/EP2010/003986.

International Preliminary Report on Patentability for corresponding International Applciation PCT/EP2010/003986.

* cited by examiner

METHOD AND CONTROLLER FOR CONTROLLING OUTPUT TORQUE OF A PROPULSION UNIT

The present application is the U.S. national stage of International Application PCT/EP2010/003986, filed 5 Jul. 2010, which claims priority to U.S. Provisional Application 61/223,428, filed 7 Jul. 2009, both of which are incorporated by reference.

BACKGROUND AND SUMMARY

The present invention relates to a method for controlling output torque of a propulsion unit in a vehicle powertrain comprising driven wheels drivingly connected to the propulsion unit via a mechanical transmission with a drive shaft, and to a corresponding controller.

It is known that an automotive powertrain is a naturally light-damped oscillatory system that will generate oscillations in response to a rapid change of force transmission. The oscillations caused by a pedal tip-in manoeuvre, where the driver for example quickly depresses the accelerator pedal negatively effects the perceived vehicle drivability, causing variations in the vehicle longitudinal tractive force, known as shuffle or vehicle jerking.

The vehicle powertrain also includes an inevitable backlash mainly due to gear play, which is caused by manufacturing tolerances in transmission and differential components. When the direction of force transmission reverses, the presences of backlash causes temporary discontinuation of the force transmission in the powertrain followed by impulsive force transmission, so that an acceleration shock occurs. Rapid transversal from positive to negative force transmission and vice versa in the powertrain will thus generate said acceleration shock, which give raise to shunt or clonk when opposing sides of the backlash are reached.

In one known solution, model state reference trajectories of engine speed are generated. These reference trajectories are based on the registered change in accelerator pedal position, and are designed to provide a damped transition to a new torque request and a relatively smooth transition of the backlash. A power demand controller subsequently generates a compensated power demand to the engine according to the said generated reference trajectories, thereby reducing shuffle. A force transmission based on reference trajectories however leads to relatively low drivability in terms of quick response to driver torque demand with good damping of driveline oscillations.

Another known solution for only reducing shunt due to backlash in production vehicles is to use simple but carefully tuned compensation schemes to avoid traversing the backlash too rapidly, wherein negative backlash effects are traded against loss of responsiveness to torque requests. Such a solution is presented in U.S. Pat. No. 6,377,882 B1, where a central control section detects a reversal in transmission force, and in response thereto restricts the applied torque to a half of a target torque between a time point preceding the detected time point of backlash and a time point after said detected time point of backlash. Thereafter, the central control section changes the torque in a stepped manner to the target torque. As a result, an abrupt change in acceleration is reduced and the negative effects of backlash are decreased. This solution however does not solve the problem of shuffle, and none of the presented prior art solutions take into account varying parameters of the system and its environment, thus requiring careful tuning and calibration of the system to function properly.

There is thus a need for an improved method and system for controlling output torque of a propulsion unit removing the above mentioned disadvantages.

It is desirable to provide an inventive method and torque controller for controlling output torque of a propulsion unit where the previously mentioned problems are partly avoided. A method according to an aspect of the present invention comprises the steps of registering driver torque demand for vehicle propulsion, registering propulsion unit rotational speed, and controlling said output torque of said propulsion unit to asymptotically follow said driver torque demand. Controlling is performed using a closed-loop linear-quadratic regulator (LQR) based controller having said driver torque demand and said propulsion unit rotational speed as input data, with the aim to minimize driveline oscillations.

A controller according to an aspect of the present invention is a closed-loop linear-quadratic regulator (LQR) based controller, and wherein the controller is arranged to control the output torque of said propulsion unit by the steps of registering driver torque demand for vehicle propulsion, registering propulsion unit rotational speed, and controlling said output torque of said propulsion unit to asymptotically follow said driver torque demand having said driver torque demand and said propulsion unit rotational speed as input data, in order to minimize driveline oscillations.

Further advantages are achieved by implementing one or several of the features of the dependent claims.

BRIEF DESCRIPTION OF THE DRAWINGS

The present invention will now be described in detail with reference to the figures, wherein.

DETAILED DESCRIPTION

The inventive method and torque controller for controlling output torque of a propulsion unit uses a closed-loop linear-quadratic regulator (LQR) based torque controller for damping driveline oscillations in an automotive driveline. The developed controller has the attractive feature of fitting very well into the archetypical heavy truck engine control system of today, being based on torque control. Thus, the controller can easily be incorporated as an additional torque compensator. The inventive method and controller is suitable for controlling output torque of different types of propulsion units, such as diesel engines, spark ignition engines, and electric motors. The torque control of the LQR controller is particularly advantageous for propulsion units having fast torque response, such as a diesel engine, because of the optimal control with respect to quick response to driver torque demand while maintaining good damping of driveline oscillations.

The controller damps driveline oscillations by compensating the driver's engine torque demand, which is asymptotically tracked. This is achieved by using the time derivative of the drive shaft torque, which is closely related to the vehicle jerk, as a virtual system output that is regulated to zero. Thereby the controller does not need a reference model for generation of reference trajectories for the control law evaluation.

According to an embodiment of the invention, the LQR-based torque controller is also extended to optimization based handling of the backlash. The properties of the controller are disclosed and the behaviour is illustrated by simulation examples and verified by experiments.

The LQR-based controller is a model based controller. The piecewise linear fourth order model shown in FIG. 2 has been disclosed in more detail in Templin, P. (2008), "Simultaneous estimation of driveline dynamics and backlash size for control design", *Proceedings of the 2008 IEEE International Conference on Control Applications—CCA2008*, pp 13-18, and a more detailed motivation of the backlash description is given in Nordin, M., Gutman, P. O. (2002), "Controlling mechanical systems with backlash—a survey", *Automatica*, 2002, pp. 1633-1649.

Figure 2:
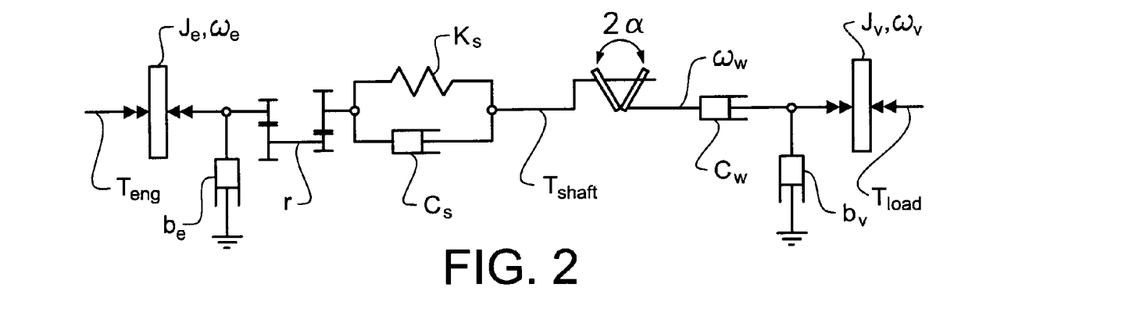
FIG. 2 shows a driveline model with backlash according to the invention.

The model illustrated in FIG. 2 has two input signals, engine torque $T_{eng}$ and road load $T_{load}$. Engine speed $\omega_e$ and vehicle speed $\omega_v$ are measurable output signals and also model state variables of an observer described more in detail below. The third state is the drive shaft torsion angle $\theta_s$ and the last is the backlash angle $\theta_b$. The derivative of the drive shaft torque $\dot{T}_{shaft}$ and the backlash angle $\theta_b$ are defined as model outputs. The backlash size is defined to be $2\alpha$ so that the backlash angle $\theta_b$ is limited by $-\alpha \leq \theta_b \leq \alpha$. Measurement signals for engine speed $\omega_e$ and vehicle speed $\omega_v$ are normally available in a powertrain control unit.

Figure 1:
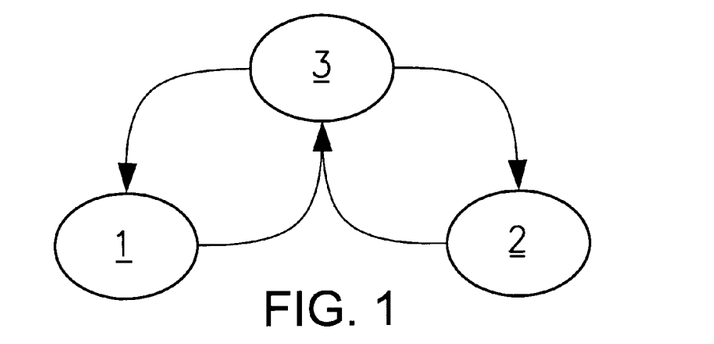
FIG. 1 shows a model of mode transition conditions according to the invention.

The nonlinearity introduced by the backlash effectively decouples the engine from the wheels during the transition of the backlash. It is therefore possible to define three modes 1, 2, 3 of the model as shown in FIG. 1, including their mode transitions. The powertrain can be in contact mode either on the negative 1 or on the positive 2 drive side, or it can be in non-contact mode 3 during the backlash transition. The condition for changing mode from negative side contact mode 1 to non-contact mode 3 is drive shaft torque $T_{shaft}>0$. The condition for changing mode from positive side contact mode 2 to non-contact mode 3 is drive shaft torque $T_{shaft}<0$. The conditions for changing mode from non-contact mode 3 to negative side contact mode 1 are backlash angle $\theta_b=-\alpha$ and time derivative of the backlash angle $\dot{\theta}_b<0$, and the conditions for changing mode from non-contact mode 3 to positive side contact mode 2 are backlash angle $\theta_b=\alpha$ and time derivative of said backlash angle $\dot{\theta}_b>0$.

The main variables for the changes are thus the drive shaft torque $T_{shaft}$ and the current position in the backlash angle $\theta_b$. The drive shaft cannot transmit positive torque when the system is in contact on the negative side, and the drive shaft cannot transmit negative torque when the system is in contact on the positive side.

The engine is described as an ideal torque source $T_{eng}$ with a mass-moment of inertia $J_e$ and viscous friction $b_e$. The gearbox ratio together with the final gear is described by the ratio r. It is assumed that the driveline main flexibility is in the drive shafts, represented by $k_s$ and $c_s$. Wheel slip is often neglected for simplicity. In this approach it is represented by the damper $c_w$. The vehicle inertia is denoted $J_v$, with viscous friction term $b_v$. The road load is described by the exogenous signal $T_{load}$, and represents mainly road inclination, road resistance, and wind resistance. Wheel speed $\omega_\omega$ is not a model state variable since the wheel slip is included but it can be defined as an extra model output if needed.

The state space representation of equation 1 and equation 2 below can be derived from the laws of motion and the properties of the dampers with $$c' \frac{c_\omega}{c_\omega + c_s}$$

defined for convenience.

Contact mode:

$$\begin{pmatrix} \dot{\theta}_s \\ \dot{\omega}_e \\ \dot{\omega}_v \\ \dot{\theta}_b \end{pmatrix} = \quad \text{(Equation 1)}$$

$$\begin{pmatrix} -\dfrac{k_s c'}{c_\omega} & \dfrac{c'}{r} & -c' & 0 \\ -\dfrac{k_s c'}{J_e r} & -\dfrac{c'\left(\dfrac{c_s}{r^2} + \dfrac{c_s b_e}{c_\omega} + b_e\right)}{J_e} & \dfrac{c_s c'}{r J_e} & 0 \\ \dfrac{k_s c'}{J_v} & \dfrac{c_s c'}{J_v r} & -\dfrac{c'\left(\dfrac{b_v c_s}{c_\omega} + c_s + b_v\right)}{J_v} & 0 \\ 0 & 0 & 0 & 0 \end{pmatrix}$$

$$\begin{pmatrix} \theta_s \\ \omega_e \\ \omega_v \\ \theta_b \end{pmatrix} + \begin{pmatrix} 0 \\ \dfrac{1}{J_e} \\ 0 \\ 0 \end{pmatrix} T_{eng} + \begin{pmatrix} 0 \\ 0 \\ -\dfrac{1}{J_v} \\ 0 \end{pmatrix} T_{load}$$

Non-contact mode:

$$\begin{pmatrix} \dot{\theta}_s \\ \dot{\omega}_e \\ \dot{\omega}_v \\ \dot{\theta}_b \end{pmatrix} = \quad \text{(Equation 2)}$$

-continued $$\begin{pmatrix} -\frac{k_s}{c_s} & 0 & 0 & 0 \\ 0 & -\frac{b_e}{J_e} & 0 & 0 \\ 0 & 0 & -\frac{b_v}{J_v} & 0 \\ 0 & \frac{1}{r} & -1 & 0 \end{pmatrix} \begin{pmatrix} \theta_s \\ \omega_e \\ \omega_v \\ \theta_b \end{pmatrix} + \begin{pmatrix} 0 \\ \frac{1}{J_e} \\ 0 \\ 0 \end{pmatrix} T_{eng} + \begin{pmatrix} 0 \\ 0 \\ -\frac{1}{J_v} \\ 0 \end{pmatrix} T_{load}$$

Figure 3:
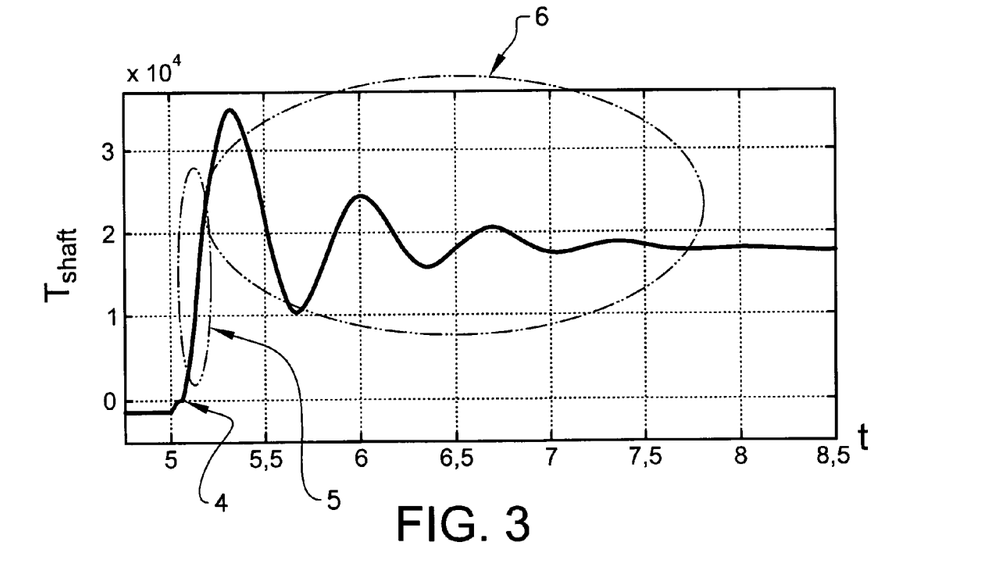
FIG. 3 shows a simulation of the drive shaft torque after en engine torque step.

FIG. 3 includes an X-Y diagram wherein the y-axis denotes drive shaft torque $T_{shaft}$ in Newton meter and the x-axis denotes time in seconds. The diagram shows a simulation of the drive shaft torque $T_{shaft}$ after a pedal tip-in manoeuvre by the driver, including the shunt and shuffle-phenomenon. Initially, the system is in contact mode 1 on the negative drive side up to t=5,0 seconds, during which the drive shaft torque $T_{shaft}$ is negative. Then follows the traversing of the backlash, during which the powertrain is in non-contact mode 3, and the drive shaft torque $T_{shaft}$ becomes zero. Finally, the system is in contact mode 2 on the positive drive side. During the transition of the backlash 4, the engine accelerates freely which makes the relative speed compared to the wheels higher. When the system enters contact mode 2 on the positive side, drive shaft torque $T_{shaft}$ increases rapidly and the vehicle jerks forward giving raise to shunt effect 5. A high impact speed amplifies the forthcoming oscillations, i.e. shuffle 6, and may also be clearly audible to the driver. It is therefore essential that a controller monitors the transition conditions between the modes 1, 2, 3.

The main requirements on the powertrain controller are performance related, and emphasis is on drivability. The drivability requirement is here basically translated into requirements on damping of driveline oscillations and smooth traversal of the driveline backlash, while still providing a quick response to driver torque demands $T_d$. In addition to the performance related demands on the controller, the controller should fit into the existing control structure of the propulsion unit control unit, in particular diesel engine control unit.

Figure 4:
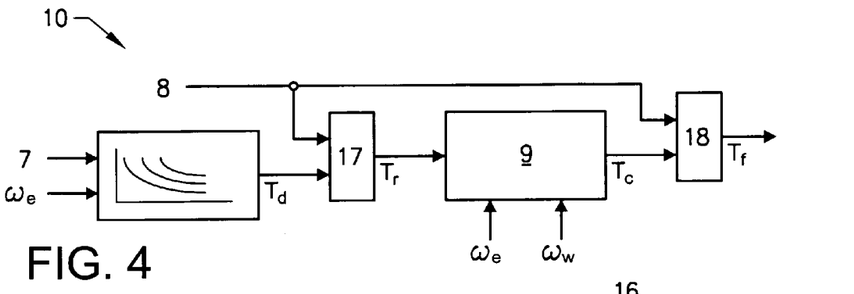
FIG. 4 shows the LQR-controller structure according to the invention.

The resulting LQR-controller structure 10 is depicted in FIG. 4, where it can be seen that the main source for controller torque demand $T_r$ is the driver. The accelerator pedal position 7 and engine speed $\omega_e$ are translated into driver torque demand $T_d$. A torque reference set point $T_r$ is subsequently determined in a first comparator 17 by comparing the driver torque demand $T_d$ with a set of active torque limitations 8, and selecting the minimum value of all said input values as torque reference set point $T_r$. Said torque reference set point $T_r$ is subsequently compensated by the damping/backlash controller 9 described below, which generates a compensated torque $T_c$. Finally, a controller torque demand $T_f$ is determined in a second comparator 18 by comparing the compensated torque $T_c$ with a set of active torque limitations 8, and selecting the minimum value of all said input values as controller torque demand $T_f$. The impact of the second application of the active torque limits 8 in the second comparator 18 is minimized by a tuning of the controller 9 that minimizes overshoots at requested torque steps. A consequence of the chosen controller structure 10 is that a compensated torque $T_c$ must approach a torque reference set point $T_r$ asymptotically.

The invention is however not limited to use of said active torque limits 8 and first and second comparators 17, 18, in which case the torque reference set point $T_r$ is identical to the driver torque demand $T_d$, and controller torque demand $T_f$ is identical to compensated torque $T_c$.

It is desirable that the complete controller 9 should be easy to tune. Since the controller 9 is model based, much of the tuning is done implicitly by fitting a model to the specific powertrain. Additional tuning can often be made with a small number of parameters that affect the closed loop properties in an intuitive way.

The control design is based on the piecewise linear model of the system presented in FIG. 2. The controller 9 relics on full state information x̂ for calculation of the controller torque demand $T_f$, i.e. the engine torque request, but only the engine speed $\omega_e$ and vehicle speed $\omega_v$ are measurable outputs. It is furthermore not possible to measure the backlash angle $\theta_b$ to determine if the system is in any of the contact modes 1, 2 or in a non-contact mode 3. The solution is showed in FIG. 5, where an arrangement comprising the controller structure 10, vehicle 11, and state observer 12 is disclosed. Road load 16 is a variable parameter that affects the vehicle 11. The state observer 12 is used to gain full state vector information x̂ and to detect system mode changes. The observer 12 for the contact modes 1, 2 cannot be based on the state space description in equation 1 directly with the available measurement signals because the system is not observable. But the fourth order model may be reduced to third order since the backlash angle $\theta_b$ is constant in contact modes 1, 2. Then the state vector is observable using either both available measurements $\omega_e$, $\omega_v$, or the engine speed only $\omega_e$, if the quality of the vehicle speed $\omega_v$ measurement is poor.

Figure 5:
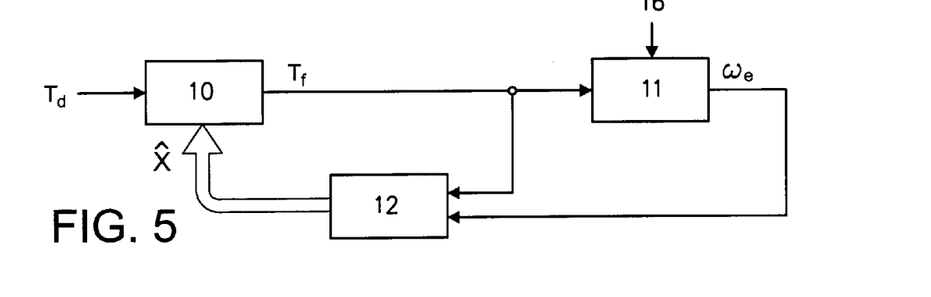
FIG. 5 shows an arrangement comprising the controller structure, vehicle, and state observer according to the invention.

The described embodiment of the invention uses the Loop Transfer Recovery (LTR)-methodology for the contact mode observer design. LTR-design tries to balance the influence of state and measurement disturbances with a tuning, parameter. In this way, robust and good closed-loop properties can be obtained. An observer gain of the inventive method and torque controller might however alternatively be based on pole placement techniques or Kalman filter theory. A detailed description of the (LTR)-methodology is presented by Pettersson, M. (1997), "Driveline modelling and control", *PhD Thesis, Dept. of Electrical Engineering, Linköping University Sweden*, and Glad, T., Ljung, L. (2000), "Control Theory", *Taylor Francis*, 2000, chapter 9. The observer 12 outputs are drive shaft torsion angle $\theta_s$, and drive shaft torque $T_{shaft}$, which are used for the control law evaluation and state mode transitions, respectively.

When the system enters the non-contact mode 3 due to backlash, state information can only be estimated by using a system simulation because the engine and the wheels are effectively decoupled and the system observability is lost. A detailed description of said system simulation is presented in Ferrari-Trecate G., Mehdi, G. (2006), "Observability analysis and state observers for automotive powertrains with backlash: a hybrid system approach", *International Journal of Control*, Vol. 79, No. 5, May 2006, pp. 496-507, and Templin, P. (2008), "Simultaneous estimation of driveline dynamics and backlash size for control design", *Proceedings of the 2008 IEEE International Conference on Control Applications—CCA2008*, pp 13-18. With the described observer 12, using the LTR-based design for the contact modes 1, 2, system simulation for the non-contact mode 3, and the mode transition conditions described in relation to FIG. 1, the controller 9 has all the information it needs for the control law evaluation.

The contact mode is characterized in that the backlash angle is constant, which essentially means that the fourth state equation row of equation 1 is not active in this mode. The controller 9 is therefore derived using equation 1 with the backlash angle state removed, so the state vector is here defined as $x_a=(\theta_s,\theta_a,\theta_r)$. The upper left 3×3-part of the system matrix in equation 1 is denoted $A_a$ and the corresponding input matrix $B_a$. The drive shaft torque can be defined as an output:

$$T_{shaft}(t) = \left[ c'k_s \frac{c'c_s}{r} - c'c_s \right] x_a(t) \quad \text{(Equation 3)}$$

The main task for the controller 9 is to damp driveline oscillations, i.e. shuffle 6, which in this context is interpreted as regulating the time derivative of the drive shaft torque $\dot{T}_{shaft}$ to zero. The time derivative of the drive shaft torque $\dot{T}_{shaft}$ is therefore defined as a model output and included in a performance index, also called cost function of the LQR controller 9. An advantage with this choice is that no state reference trajectories are needed for the implementation of the final control law since the reference value for the drive shaft torque derivative $\dot{T}_{shaft}$ is always zero.

A control signal should always be included in a performance index as a mean to balance performance and control effort. In this case however, a requirement of the controller 9 is to asymptotically follow the driver's torque demand $T_d$. A solution to this is to include the difference between the driver's torque demand $T_d$ and the controller torque demand $T_f$ in the performance index. Integral action is introduced by extending the model by a fourth state $x_u$ that integrates the difference between said driver's torque demand $T_d$ and said controller torque demand $T_f$. This ensures that the controller output, i.e. controller torque demand $T_f$ asymptotically follows the driver's torque demand $T_d$, i.e. that the controller output approaches the driver's torque demand $T_d$. The performance index can then be written:

$$J = \int_0^{t_f} \left( \frac{1}{2} y^T(t) Q y(t) + \frac{1}{2}(u(t) - u_r)^2 \right) dt \quad \text{(Equation 4)}$$

with the system outputs $y^T(t)=[\dot{T}_{shaft}(t)\ x_u(t)]$, a diagonal positive semi definite 2×2 weighting matrix $Q=\text{diag}(q_1,q_2)$, the compensated torque $u(t)=T_c$ representing controller torque demand $T_f$ before active torque limitations 8, and the torque reference set point $u_r=T_r$ representing driver's engine torque demand $T_d$ after active torque limitations 8.

Before the optimal control law that minimizes equation 4 can be derived by standard methods it needs to be re-formulated. Define the steady state solution $x_a^r$ such that $$A_a x_a^r + B_a u_r = 0 \Rightarrow x_a^r = -A_a^{-1} B_a u_r \quad \text{(Equation 5)}$$

Define a new set of state variables $\zeta$ and a new control variable $\upsilon$.

$$\zeta(t) = \begin{bmatrix} x_a(t) - x_a^r \\ x_u(t) \end{bmatrix} \quad \text{(Equation 6)}$$

$$v(t) = (u(t) - u_r) \quad \text{(Equation 7)}$$

Desired outputs are the derivative of the drive shaft torque as defined in equation 3, and the fourth state $x_u$. The transformed system then becomes $$\dot{\zeta} = \begin{bmatrix} A_a & 0 \\ 0 & 0 \end{bmatrix} \begin{bmatrix} x_a - x_a^r \\ x_u \end{bmatrix} + \begin{bmatrix} B_a \\ 1 \end{bmatrix} (u - u_r) \triangleq A\zeta(t) + Bv(t) \quad \text{(Equation 8)}$$

$$T_{shaft}(t) = C_a x_a(t) \Rightarrow \dot{T}_{shaft}(t) = C_a A_a x_a(t) + C_a B_a u(t) = C_a A_a (x_a(t) - x_a^r(t)) + C_a B_a (u(t) - u_r) \quad \text{(Equation 9)}$$

$$y = \begin{bmatrix} \dot{T}_{shaft} \\ x_u \end{bmatrix} = \begin{bmatrix} C_a A_a & 0 \\ 0 & 1 \end{bmatrix} \zeta + \begin{bmatrix} C_a B_a \\ 0 \end{bmatrix} v \triangleq C\zeta + Dv \quad \text{(Equation 10)}$$

The minimization of equation 4 can now be written $$\min \int_0^{t_f} \left( \frac{1}{2} y^T(t) Q y(t) + \frac{1}{2} v(t)^2 \right) dt = \quad \text{(Equation 11)}$$

$$\min \int_0^{t_f} \frac{1}{2} [\zeta^T\ v] \begin{bmatrix} C^T Q C & C^T Q D \\ D^T Q C & 1 + D^T Q D \end{bmatrix} \begin{bmatrix} \zeta \\ v \end{bmatrix} dt \triangleq$$

$$\min \int_0^{t_f} \frac{1}{2} [\zeta^T\ v] \begin{bmatrix} Q_\zeta & S \\ S^T & R \end{bmatrix} \begin{bmatrix} \zeta \\ v \end{bmatrix} dt$$

which is solved by using the Riccati-equation and forming a state feedback control law.

$$A^T P + PA - (PB + S)R^{-1}(B^T P + S^T) + Q_\zeta = 0 \quad \text{(Equation 12)}$$

$$K = R^{-1}(B^T P + S^T) = \frac{(B^T P + S^T)}{1 + D^T Q D} \quad \text{(Equation 13)}$$

$$K_{(1 \times 4)} = [K_{a(1 \times 3)}\ K_{u(1 \times 1)}]$$

$$v(t) = -K\zeta(t) = -K_a(x_a(t) - x_a^r) - K_u x_u \Rightarrow u(t) = -K_a x_a(t) - K_u x_u(t) + (1 - K_a A_a^{-1} B_a) u_r = -K_a x_a(t) - K_u x_u(t) + K_r u_r \quad \text{(Equation 14)}$$

The control law is thus the sum of a linear weighting of the states $x_a$ and $x_u$ and a feed forward term from the driver's torque demand $T_d$. It can be noted that no reference trajectories are needed for the evaluation.

Figure 6:
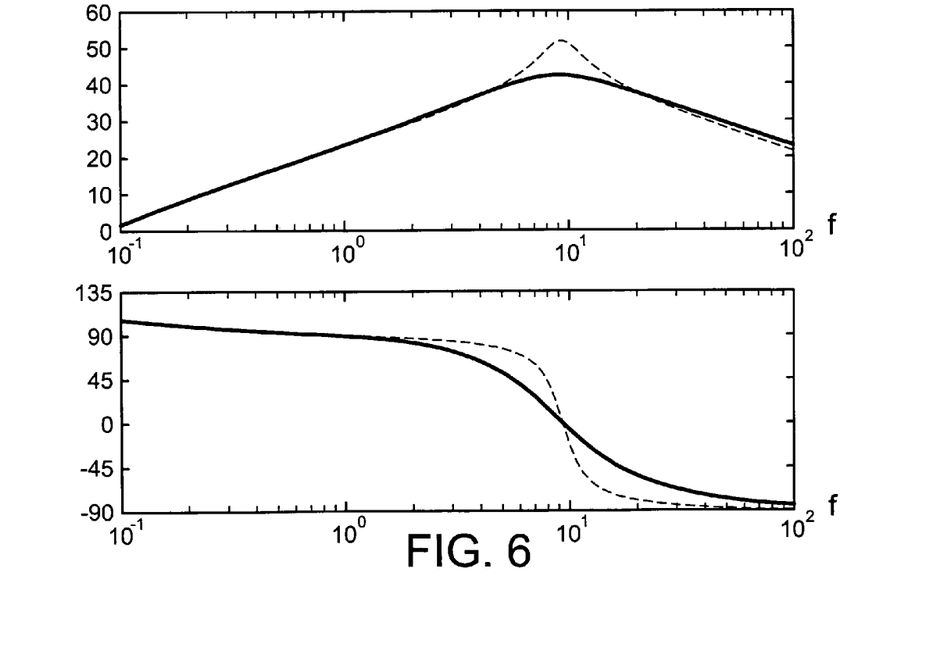
FIG. 6 shows a Bode diagram example of the transfer function from the driver's torque demand to the derivative of the drive shaft torque.

FIG. 6 shows a Bode diagram example of the transfer function from the driver's torque demand $T_d$ to the derivative of the drive shaft torque $\dot{T}_{shaft}$.

In the upper plot, the y-axis denotes magnitude in decibel while the x-axis denotes frequency in radians per second. In the lower plot, the y-axis denotes phase in degrees while the x-axis denotes frequency in radians per second. The dashed line is the characteristics of the system without controller, the solid line with said inventive controller.

According to an additional aspect of the invention, an optimization based strategy is applied for the traversal of the backlash. The controller 9 handles engine torque variations and road disturbances well when the system is in any of the contact modes 1, 2. But if the sign of the drive shaft torque $T_{shaft}$ changes, the traversing of the backlash may cause shunts and amplification of the following oscillations as illustrated in FIG. 3. The inventive idea is to limit the requested torque until the opposite side of the backlash is reached, so that the relative speed between the engine and the wheels is limited when the opposing side is reached. Here, requested torque denotes either torque request received from driver, i.e. driver torque demand $T_d$, or if active torque limitations 8 are applied, torque request received from first comparator 17, i.e.

torque reference set point $T_r$. In the disclosed embodiment, this is made by introducing a fixed intermediate torque hold value $u_{rhold}$ to the torque reference set point $u_r$, thus limiting the torque reference set point $u_r$, until contact is reached.

Figure 7:
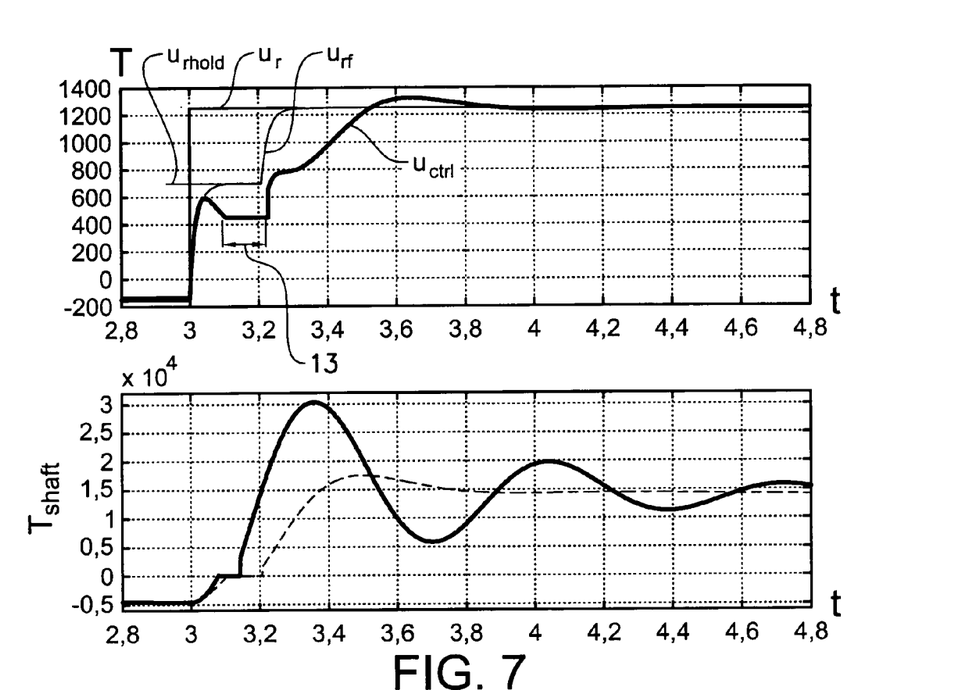
FIG. 7 shows simulation example of engine torque rise with backlash traversing.

FIG. 7 shows a simulation example where a torque step rise is requested. In the upper plot, the y-axis denotes engine torque in Newton meter and the x-axis denotes time in seconds. This plot shows the reference torque $u_r$ corresponding to torque reference set point $T_r$, the same signal slightly low-pass filtered $u_{rf}$ where also an intermediate torque hold value $u_{rhold}$ is visible. Low-pass filtration of the input signal is normally performed to reduce high-frequency noise, resonance and aliasing etc. Application of the hold level to the reference torque $u_r$, is well as subsequent low-pass filtration is performed prior to evaluation of the optimal control low of the controller 9 derived in equation 14 above. The third signal $u_{ctrl}$ is the controller output corresponding to compensated torque $T_c$.

In the lower plot, the y-axis denotes drive shaft torque $T_{shaft}$ in Newton meter and the x-axis denotes time in seconds. This plot shows the drive shaft torque $T_{shaft}$ increase, where the oscillatory solid curve shows the result without any controller 9 and the smoother dashed curve shows the outcome when the controller 9 is active.

This behaviour requires application of a modified version of the performance index of equation 4 to find an appropriate intermediate torque hold level that limits the jerk following the traversing of the backlash.

$$J = \int_0^{t_f} \left( \frac{1}{2} y^T(t) Q y(t) + \frac{1}{2} (u(t) - u_r)^2 \right) dt + q_b \theta_b^2(t_+) \quad \text{(Equation 15)}$$

The additional term is evaluated at the time instance t, which is defined as the time when the opposing side of the backlash is reached. The intermediate torque hold value $u_{rhold}$ is chosen to minimize equation 15 with the help of numerical optimization. During the optimization, the linear controller 9 is active when the system is in contact mode. During the backlash transition, i.e. non-contact mode, the controller operates in an open loop configuration, and controller output $u_{ctrl}$ can for example be held constant. Many other implementations of the inventive idea are however possible, such as a time-variable controller output during the non-contact mode.

Figure 8:
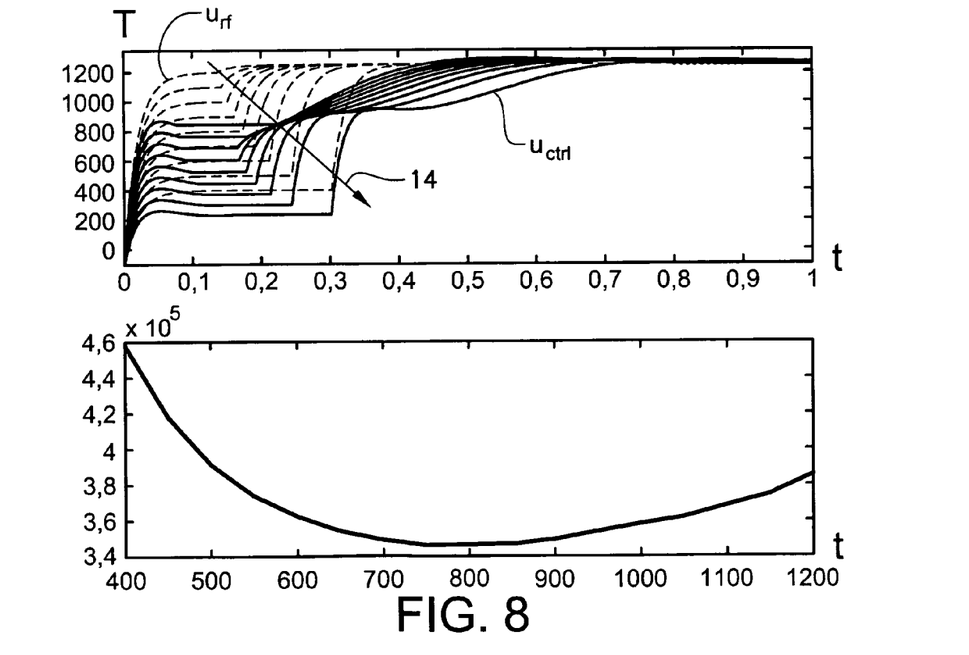
FIG. 8 shows in the upper plot engine torque optimization trajectories, and corresponding loss function values in the lower plot.

The solid lines in the upper plot of FIG. 8 show examples of how the controller output $u_{ctrl}$ varies for a range of $u_{rhold}$-values and a reasonable $q_b$-value, wherein the arrow 12 indicated decreased $u_{rhold}$-values. The dashed lines show the signals corresponding the low-pass filtered reference torque $u_{rf}$, wherein the y-axis denotes engine torque in Newton meter and the x-axis denotes time in seconds. The lower plot of FIG. 8 shows how the result of the performance index of equation 15 varies with said $u_{rhold}$-values, and that a specific $u_{rhold}$-value can be determined that minimizes the performance index value of equation 15, whereby the y-axis denotes performance index and the x-axis denotes torque reference hold level in Newton meter.

The tuning parameters of the controller summarize to $q_1$, $q_2$, and $q_b$. The final tuning of these will be made in the vehicle to obtain the desired drivability. $q_1$ makes the trade-off between controller responsiveness and how fast oscillations decay, $q_2$ is tuned to assure expected control value tracking of the driver's reference value. The effect of the shunt after the traversing of the backlash is determined by $q_b$. This gives the person responsible for the tuning a clear set of parameters to work with. The model based approach ensures the adaption to the specific vehicle.

Below, experimental results from tests of the presented controller on a Volvo FH16 heavy duty truck are presented. The observer and control law are implemented on a laptop computer which is connected to the truck CAN-bus.

The methodology for estimating the parameters of the presented model is described in detail in Templin, P. (2008), "Simultaneous estimation of driveline dynamics and backlash size for control design", *Proceedings of the* 2008 *IEEE international Conference on Control Applications—CCA*2008, pp 13-18. The method is implemented on a laptop and uses the same standard signals as the controller. The main parameters for the test vehicle are listed below.

Figure 9:
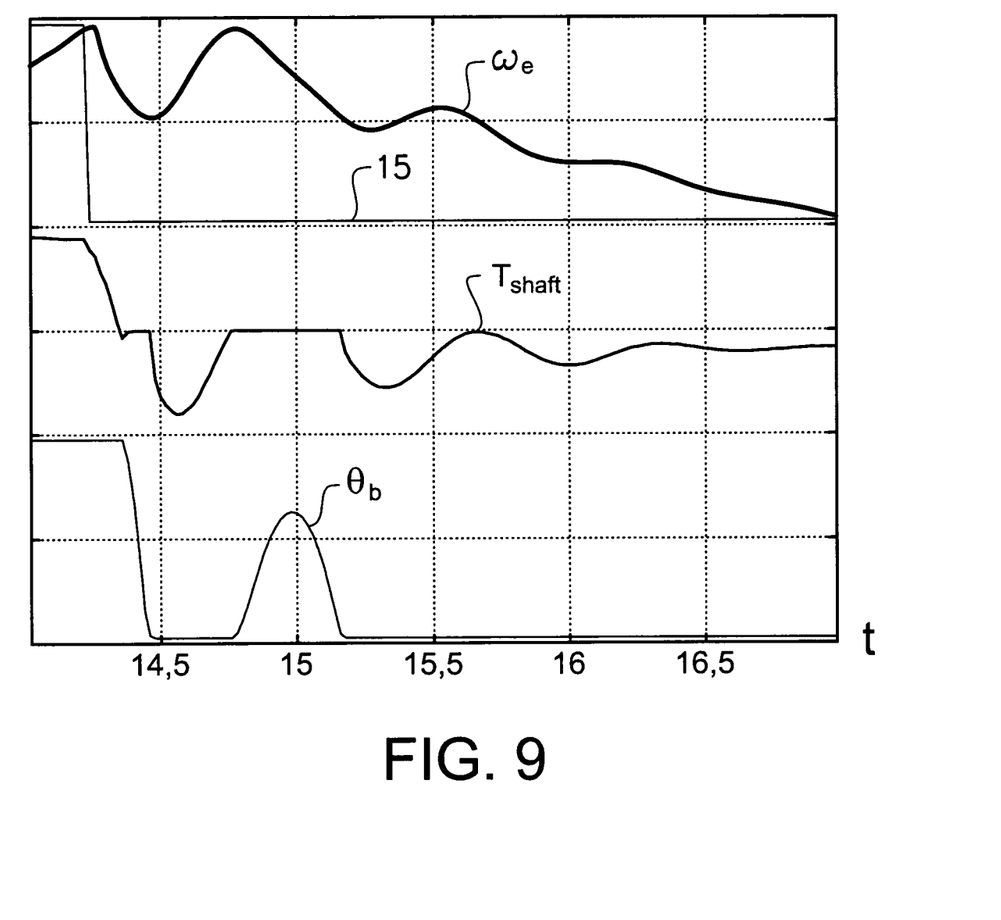
FIG. 9 shows measured engine speed and estimated drive shaft torque and backlash angle in response to a torque step request.

FIG. 9 shows a measurement of the combined observer behaviour at an engine torque step down request. The curve scales are normalized and the x-axis denotes time in seconds. The engine speed $\omega_e$ is measured and the engine torque signal is estimated by the engine control unit. The drive shaft torque $T_{shaft}$ and the backlash angle $\theta_b$ are estimated by the combined observer 12. Initially, the vehicle is accelerating at high engine torque $T_{eng}$. Zero engine torque is requested at t≈14.2 s. The drive shaft torque $T_{shaft}$ rapidly decays to 0 Nm and then the backlash is quickly traversed, whereby the backlash angle goes from +α to −α. As the drive shaft torque $T_{shaft}$ becomes increasingly negative, the engine speed "swings back", until the drive shaft transmits zero torque and the backlash is entered again. During this decoupled period, the engine speed $\omega_e$ decays due to engine friction only. In this case, the position in the backlash never reaches the positive drive side before it falls back to the negative side again and thereafter stays there.

Figure 10A:
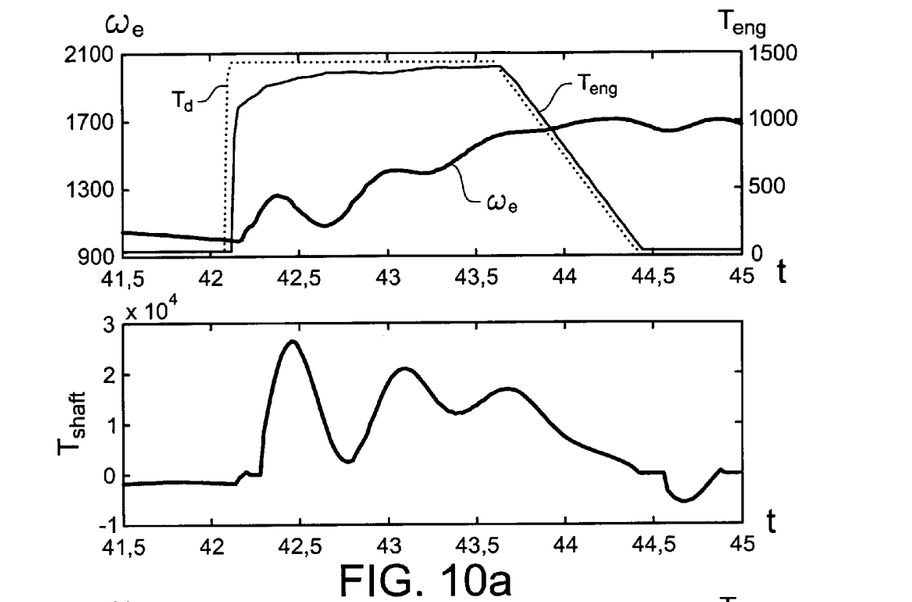
FIG. 10a shows measured engine speed, engine torque, and estimated drive shaft torque in response to a torque step request without controller.
Figure 10B:
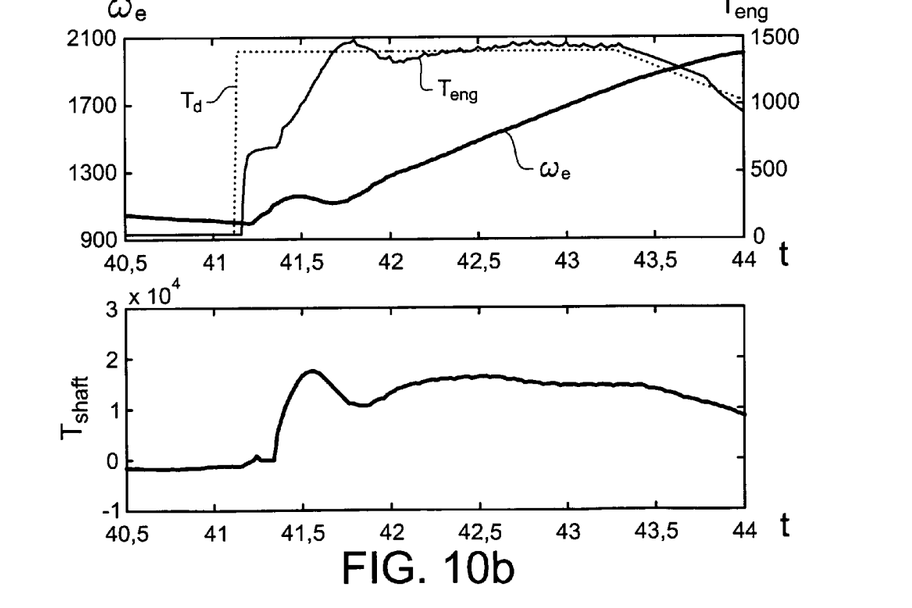
FIG. 10b shows measured engine speed, engine torque, and estimated drive shaft torque in response to a torque step request with a controller according to the invention.

The controller 9 is tested in the case when there is a stepwise request for a torque rise $T_d$. The driveline is initially in contact mode on the negative drive side. The upper plot of FIG. 10(a) shows a reference measurement of the engine speed $\omega_e$ following an engine torque step, wherein the left y-axis denotes engine speed in rpm, right y-axis denotes engine torque in Newton meter, and the x-axis denotes time in seconds. The lower plot of FIG. 10(a) shows the estimated drive shaft torque $T_{shaft}$ calculated by the observer 12, wherein the y-axis denotes said drive shaft torque $T_{shaft}$ in Newton meter and the x-axis denotes time in seconds. FIG. 10(b) shows a corresponding step using the closed loop controller 9. The physical units of the plots of FIG. 10(b) correspond to those of FIG. 10(a). The controller thus behaves well and in good agreement with the simulations.

The simulation results and the control design are based on data obtained from system identification experiments with a Volvo FH16 Rigid 6×4 truck.

| | |
|---|---|
| Vehicle mass | 24450 kg |
| Engine moment of inertia | 5.635 kgm2 |
| Wheel radius | 0.508 m |
| Final gear ratio | 3.79 |
| Gearbox ratio (4'th gear) | 5.571 |
| Combined shaft stiffness | 179 kNm/rad |
| Combined shaft damping | 8.26 kNm/(rad/s) |
| Combined wheel damping | 81.5 kNm/(rad/s) |

Reference signs mentioned in the claims should not be seen as limiting the extt of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

Reference Sign Correspondence Table

| | |
|---|---|
| $\omega_e$ | Propulsion unit rotational speed |
| $\omega_w$ | Wheel speed |
| $\omega_v$ | Vehicle speed |
| $\hat{x}$ | Full state vector information |
| $\theta_s$ | Drive shaft torsion angle |
| $\theta_b$ | Backlash angle |
| $\dot{\theta}_b$ | Time derivative of backlash angle |
| $T_{shaft}$ | Drive shaft torque |
| $\dot{T}_{shaft}$ | Time derivative of a drive shaft torque |
| $T_{eng}$ | Output torque of a propulsion unit |
| $T_d$ | Driver torque demand |
| $T_f$ | Controller torque demand |
| $T_r$, u(r), $u_r$ | Torque reference set point |
| $u_{rf}$ | Low pass filtered torque reference set point |
| $T_c$, u(t), $u_{ctrl}$ | Compensated torque, controller output |
| $u_{rhold}$ | Intermediate torque hold value |
| $x_u$ | Integrated difference between $T_d$ and $T_f$ |
| $J_e$ | Engine mass-moment of inertia |
| $b_e$ | Engine viscous friction |
| $J_v$ | Vehicle inertia |
| $b_v$ | Vehicle viscous friction |
| r | Combined gearbox and final gear ratio |
| $k_s$ | Drive shafts spring constant |
| $c_s$ | Drive shafts damping constant |
| $c_w$ | Damping constant representing wheel slip |
| 1 | Contact mode on the negative drive side |
| 2 | Contact mode on the positive drive side |
| 3 | Non-contact mode |
| 4 | Backlash transition |
| 5 | Shunt |
| 6 | Shuffle |
| 7 | Accelerator pedal position |
| 8 | Active torque limitations |
| 9 | Controller |
| 10 | Controller structure |
| 11 | Vehicle |
| 12 | Observer |
| 13 | Hold time |
| 14 | Arrow indicating decreased $u_{rhold}$-values |
| 15 | Engine torque request |
| 16 | Road load |
| 17 | First comparator |
| 18 | Second comparator |

The invention claimed is:

1. A method for controlling output torque ($T_{eng}$) of a propulsion unit in a vehicle powertrain comprising driven wheels drivingly connected to the propulsion unit via a mechanical transmission with a drive shaft, the method comprising:
registering a driver torque demand ($T_d$) for vehicle propulsion;
registering a propulsion unit rotational speed ($\omega_e$);
controlling the output torque ($T_{eng}$) of the propulsion unit to asymptotically follow the driver torque demand ($T_d$) using a closed-loop linear-quadratic regulator (LQR) based controller having the driver torque demand ($T_d$) and the propulsion unit rotational speed ($\omega_e$) as input data, in order to minimize oscillations;
receiving, via the closed-loop LQR based controller, a full state vector information ($\hat{x}$) from a state observer based on at least the propulsion unit rotational speed ($\omega_e$);
generating, via the closed-loop LQR based controller, a controller torque demand ($T_f$) used for the controlling of the output torque ($T_{eng}$) of the propulsion unit based on the driver torque demand ($T_d$) and the full state vector information ($\hat{x}$),
and wherein the controlling of the output torque ($T_{eng}$) of the propulsion unit is realized by regulating at least the following three performance index components of the controller to zero:
a time derivative of a drive shaft torque ($\dot{T}_{shaft}$) of the drive shaft;
an integrated difference ($x_u$) between the driver torque demand ($T_d$) and the controller torque demand ($T_f$); and
a current difference between the driver torque demand ($T_d$) and the controller torque demand ($T_f$).

2. The method according to claim 1, wherein the state observer is based on a Loop Transfer Recovery (LTR) design, and the state observer is adapted to generate the full state vector information ($\hat{x}$) based on at least the propulsion unit rotational speed ($\omega_e$) and the controller torque demand ($T_f$).

3. The method according to claim 1, wherein the full state vector information ($\hat{x}$) includes as a state variable at least a drive shaft torsion angle ($\theta_S$).

4. The method according to claim 1, wherein the step of registering the driver torque demand ($T_d$) for vehicle propulsion comprises the steps of:
translating an accelerator pedal position into the driver torque demand ($T_d$);
deriving a torque reference set point ($T_r$) from the driver torque demand ($T_d$) by comparing the driver torque demand ($T_d$) with at least one active torque limitation, and setting the torque reference set point ($T_r$) to a minimum torque value out of torque values of a comparison;
supplying the torque reference set point ($T_r$) to the closed-loop LQR based controller as the driver torque demand ($T_d$).

5. The method according to claim 1, wherein the step of generating the controller torque demand ($T_f$) used for controlling the output torque ($T_{eng}$) of the propulsion unit comprises the steps of:
generating a compensated torque ($T_c$) by the closed loop LQR based controller;
comparing the compensated torque ($T_c$) with at least one active torque limitation, and;
setting the controller torque demand ($T_f$) to a minimum torque value out of torque values of a comparison.

6. The method according to claim 1, comprising taking backlash into account in the method for controlling the output torque ($T_{eng}$) of the propulsion unit by the following step:
in case the powertrain backlash will be traversed, providing an intermediate torque hold value ($U_{rhold}$) that a requested torque ($T_d$, $T_r$) may not exceed until a contact mode is reached, in order to limit acceleration shocks following the traversing of the backlash.

7. The method according to claim 6, comprising
including backlash angle ($\theta_b$) as a state variable in the full state vector information ($\hat{x}$);
determining if the powertrain is in a negative side contact mode, a positive side contact mode, or a non-contact mode, based on state mode transition conditions;
determining if the powertrain backlash will be traversed;
determining the intermediate torque hold value ($U_{rhold}$);
controlling the output torque ($T_{eng}$) of the propulsion unit by means of an optimal control law of the closed loop LQR based controller in a contact mode, and controlling the output torque ($T_{eng}$) of the propulsion unit by means of an open-loop control during the non-contact mode.

8. The method according to claim 7, wherein the state mode transition conditions are based on a backlash angle ($\theta_b$), a time derivative of the backlash angle ($\dot{\theta}_b$), and the drive shaft torque ($T_{shaft}$).

9. The method according to claim 8, wherein the state mode transition condition or conditions for determining when the goes from:
   the negative site contact mode to the non-contact mode is when the drive shaft torque ($T_{shaft}$)>0;
   the positive side contact mode to the non-contact mode is when the drive shaft torque ($T_{shaft}$)<0;
   the non-contact mode to the negative side contact mode are when the backlash angle ($\theta_b$)=$-\alpha$ and the time derivative of the backlash angle ($\dot{\theta}_b$)<0; and
   the non-contact mode to the positive side contact mode are when the backlash angle ($\theta_b$)=$\alpha$ and the time derivative of the backlash angle ($\dot{\theta}_b$)>0,
   wherein the backlash angle ($\theta_b$) is limited by $-\alpha \leqq \theta_b \leqq \alpha$.

10. The method according to claim 6, wherein the intermediate torque hold value ($U_{rhold}$) is determined by numerical optimization based on at least an estimate of a time derivative of the backlash angle ($\dot{\theta}_b$) at a time instance when an opposing side of the powertrain backlash is reached.

11. A propulsion unit torque controller for controlling output torque ($T_{eng}$) of a propulsion unit in a vehicle powertrain comprising driven wheels drivingly connected to the propulsion unit via a mechanical transmission with a drive shaft, wherein the controller is a closed-loop linear-quadratic regulator (LQR) based controller, and the closed loop LQR based controller is arranged to control the output torque ($T_{eng}$) of the propulsion unit by the following steps:
   registering a driver torque demand ($T_d$) for vehicle propulsion;
   registering a propulsion unit rotational speed ($\omega_e$);
   controlling the output torque ($T_{eng}$) of the propulsion unit to asymptotically follow the driver torque demand ($T_d$) having the driver torque demand ($T_d$) and the propulsion unit rotational speed ($\omega_e$) as input data, in order to minimize oscillations,
   wherein the dosed loop LQR based controller is arranged to:
   receive a full state vector information ($\hat{x}$) from a state observer based on at least the propulsion unit rotational speed ($\omega_e$);
   generate a controller torque demand ($T_f$) used for controlling an output torque ($T_{eng}$) of the propulsion unit based on the driver torque demand ($T_d$) and the full state vector information ($\hat{x}$), and
   wherein the closed loop LQR based controller is arranged to control the output torque ($T_{eng}$) of the propulsion unit by regulating the following three performance index components of the controller to zero:
   a time derivative of a drive shaft torque ($\dot{T}_{shaft}$) of the drive shaft;
   an integrated difference ($x_u$) between the driver torque demand ($T_d$) and the controller torque demand ($T_f$); and
   a current difference between the driver torque demand ($T_d$) and the controller torque demand ($T_f$).

12. The propulsion unit torque controller according to claim 11, wherein the closed loop LQR based controller is arranged to take backlash into account when controlling the output torque ($T_{eng}$) of the propulsion unit by:
   in case powertrain backlash will be traversed, providing an intermediate torque hold value ($U_{rhold}$) that a requested torque ($T_d$, $T_r$) may not exceed until a contact mode is reached, in order to limit acceleration shocks following the traversing of the backlash.

13. The propulsion unit torque controller according to claim 12, comprising
   including a backlash angle ($\theta_b$) as a state variable in the full state vector information ($\hat{x}$);
   determining if the powertrain is in a negative side contact mode, a positive side contact mode, or a non-contact mode, based on state mode transition conditions;
   determining if the powertrain backlash will be traversed;
   determining the intermediate torque hold value ($U_{rhold}$);
   controlling the output torque ($T_{eng}$) of the propulsion unit by means of optimal control law of the closed loop LQR based controller in contact mode, and controlling the output torque ($T_{eng}$) of the propulsion unit by means of open-loop control during non-contact mode.

* * * * *